B. H. SMITH.
RELAY.
APPLICATION FILED JAN. 29, 1917.

1,344,730.

Patented June 29, 1920.

WITNESSES:
Ed Plinke.
J H Procter

INVENTOR
Benjamin H. Smith.
BY
Wesley G. Carr
ATTORNEY

UNITED STATES PATENT OFFICE.

BENJAMIN H. SMITH, OF TURTLE CREEK, PENNSYLVANIA, ASSIGNOR TO WESTINGHOUSE ELECTRIC & MANUFACTURING COMPANY, A CORPORATION OF PENNSYLVANIA.

RELAY.

1,344,730.  Specification of Letters Patent.  Patented June 29, 1920.

Application filed January 29, 1917. Serial No. 145,322.

*To all whom it may concern:*

Be it known that I, BENJAMIN H. SMITH, a citizen of the United States, and a resident of Turtle Creek, in the county of Allegheny and State of Pennsylvania, have invented a new and useful Improvement in Relays, of which the following is a specification.

My invention relates to relays and particularly to reverse-phase relays.

One object of my invention is to provide a relay that shall be responsive to the reversal or failure of a phase or phases of a polyphase electric circuit.

Another object of my invention is to provide a relay of the above indicated character that shall have an effective torque under all conditions, and be relatively simple and inexpensive to construct.

In the carrying out of my invention, I provide a magnetizable core member similar to the magnetizable core members that are used in watthour meters of the induction type. Two windings are disposed on the core member one of which is operatively connected across one phase of the polyphase circuit and the other of which is connected, through a relatively small transformer, to the other phase of the circuit. The windings are so connected that the currents traversing the same are substantially ninety degrees out of phase, thus causing the armature to develop an effective torque under all conditions. While the transformer is not an essential feature of the invention, it is provided for the purpose of precluding the necessity of disposing potential windings on the pole pieces of the core member that are normally provided for the series or current windings of the watthour meter. That is, the magnetizable core member, as normally used in connection with watthour meters, is provided with relatively small series poles that do not have sufficient space to receive a potential winding. The reason for using a magnetizable core member of this particular form is that, with such a core member, a more effective torque may be developed by the armature.

Figure 1:
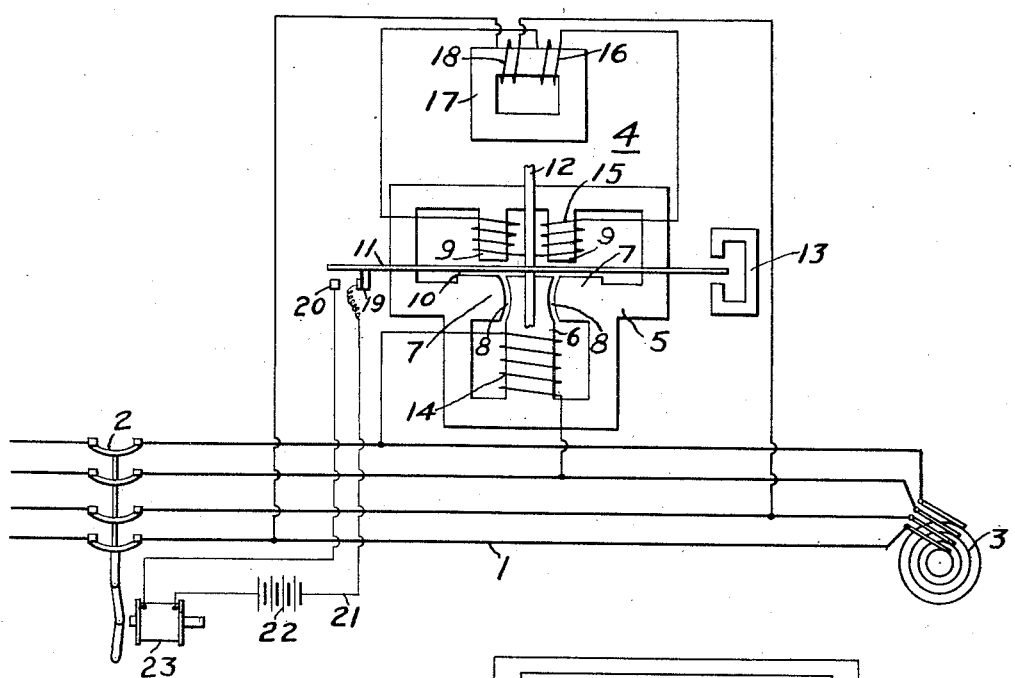
Figure 2:
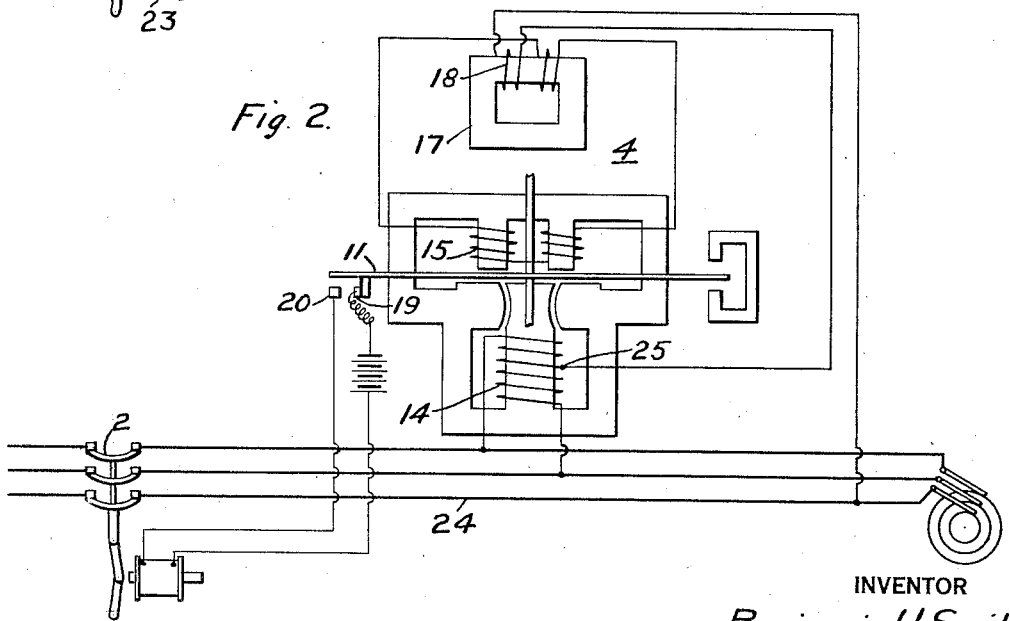

In the accompanying drawings, Figure 1 is a diagrammatic view of a two-phase electrical circuit embodying my invention, and Fig. 2 is a diagrammatic view of a three-phase electrical circuit embodying my invention.

A two-phase electrical circuit 1 comprises a circuit interrupter 2 and a two-phase motor 3. A reverse-phase relay 4 is provided for controlling the tripping of the interrupter 2 when either one or both of the phases of the circuit 1 become reversed or defective to thus preclude the motor 3 from operating incorrectly.

The reverse-phase relay 4 comprises a magnetizable core 5 having a central member 6, side members 7, separated from the central member 6 at one end by air gaps 8, and downwardly extending members 9 separated from the central member 6 and side members 7, at one end, by an air gap 10, substantially as shown in U. S. Patent No. 853,226. An armature 11 is mounted on a shaft 12 and is adapted to turn in the air gap 10. A damping magnet 13 is provided for damping the movement of the armature 11. A winding 14 is disposed on the central member 6 and is connected across one phase of the circuit 1. A winding 15 is disposed on the members 9 and is connected, in closed-circuit relation, to the winding 16 of a relatively small transformer 17. A second winding 18, that constitutes one of the windings of the transformer 17, is connected across the conductors of the other phase of the circuit 1. Thus, the winding 15 may have a relatively small number of turns in order to be disposed on the relatively small downwardly extending members 9 and still be supplied with current in accordance with the potential of one phase of the circuit 1. The windings 14 and 15 are supplied with currents that are substantially ninety degrees out of phase with respect to each other and, consequently, cause the armature 11 to turn in the one or the other direction in accordance with the relation of the phases of the circuit 1. A movable contact member 19 is mounted on the armature 1 and is adapted to engage a stationary contact member 20. The contact members 19 and 20 constitute the separable terminals of a circuit 21 comprising a source 22 of electromotive force and the trip coil 23 of the interrupter 2.

Under normal phase conditions, the armature 11 is moved to such position that the contact members 19 and 20 are out of engagement. However, when the conductors of the circuit 1 have been connected improperly, the current traversing the windings 14 and 15 will reverse, according to whether or not one or both the phases are reversed, to thus cause the armature 11 to move to such position that the contact member 19 engages the stationary contact member 20 for the purpose of tripping the interrupter 2.

In Fig. 2 of the drawings, the winding 14 of the reverse-phase relay 4 is connected across two conductors of a three-phase circuit 24. An intermediate point 25 on the winding 14 is connected to one terminal of the winding 18 of the transformer 17 the other terminal of which is connected to the other conductor of the circuit 24 to thus cause the windings 14 and 15 to correspond to a substantially T-connected winding.

Thus, the currents traversing the windings 14 and 15 will be substantially ninety degrees out of phase to cause the armature 11 to develop an effective torque under all conditions. With the exception of the change in connection of the winding 14, as above set forth, the device shown in Fig. 2 of the drawings is substantially the same as that shown in Fig. 1, and the armature 11 will be actuated to effect the tripping of the interrupter 2 when one or more phases of the circuit 4 become reversed or defective.

While I have described my invention as being particularly applicable to the tripping of circuit interrupters upon the reversal or failure of a phase or phases of a circuit, it will be understood that it may be equally well applied to the indication of the phase reversal and to other adaptations without departing from the spirit and scope of the invention as set forth in the appended claims.

I claim as my invention:

1. In a reverse-phase relay for a three-phase electric circuit, the combination with a single magnetizable core member and a rotatable armature therefor, of two windings for the magnetizable member, and a transformer, said windings being so connected to the transformer and the electric circuit that they are supplied with currents substantially ninety degrees out of phase with each other and in accordance with the potential of the respective phases of the circuit.

2. In a reverse-phase relay for a three-phase electric circuit, the combination with a single-phase motor meter, of means for so connecting the two windings thereof to the various phases of the circuit that they are supplied with currents substantially ninety degrees out of phase with each other and in accordance with the potential of the respective phases of the circuit.

3. In a reverse-phase relay for a three-phase electric circuit, the combination with a magnetizable member having pole pieces depending therefrom and a rotatable armature disposed between the pole pieces, of two windings for the pole pieces, a transformer, and means for so connecting the windings to the transformer and the electric circuit that the armature turns in one direction under normal conditions and reverses when one of the phases of the circuit reverses.

4. In a reverse-phase relay for a three-phase electric circuit, the combination with a single-phase motor-meter having two windings thereon, of a transformer, and means for so connecting the windings to the transformer and the circuit that the motor-meter will reverse its direction of rotation when the relation of the phases of the circuit are changed.

5. In a relay for a three-phase electric circuit, the combination with a magnetizable core member and an armature, of a plurality of potential windings for the core member and a transformer, said windings being so connected to the transformer and the circuit that the armature develops a maximum torque in one direction under normal conditions and a maximum torque in the other direction when a phase of the circuit becomes reversed.

6. In a reverse-phase relay for a three-phase electric circuit, the combination with a magnetizable core having a central member, side members and downwardly extending members separated from the central and side members by an air gap, and an armature disposed in the air gap, of potential windings for the central and downwardly extending member, and a transformer, said windings being so connected to the transformer and the circuit that the currents traversing the same are substantially ninety degrees out of phase with respect to each other.

7. A motor-meter for a three-phase electric circuit comprising a single magnetizable core member, an armature, a transformer, and potential windings for the core member so connected to the transformer and the circuit that the armature reverses in its direction of rotation when one phase of the circuit is reversed or is defective.

8. A relay for a three-phase electric circuit comprising a single magnetizable core member, an armature, a transformer, and windings for the core member, said windings being so connected to the transformer and the three-phase circuit that the armature reverses in its direction of rotation when any phase of the circuit becomes reversed.

In testimony whereof I have hereunto subscribed my name this 19th day of January, 1917.

BENJAMIN H. SMITH.